July 13, 1965 R. F. OXLEY 3,193,895
PLUG AND SOCKET CONNECTIONS
Filed Feb. 23, 1962
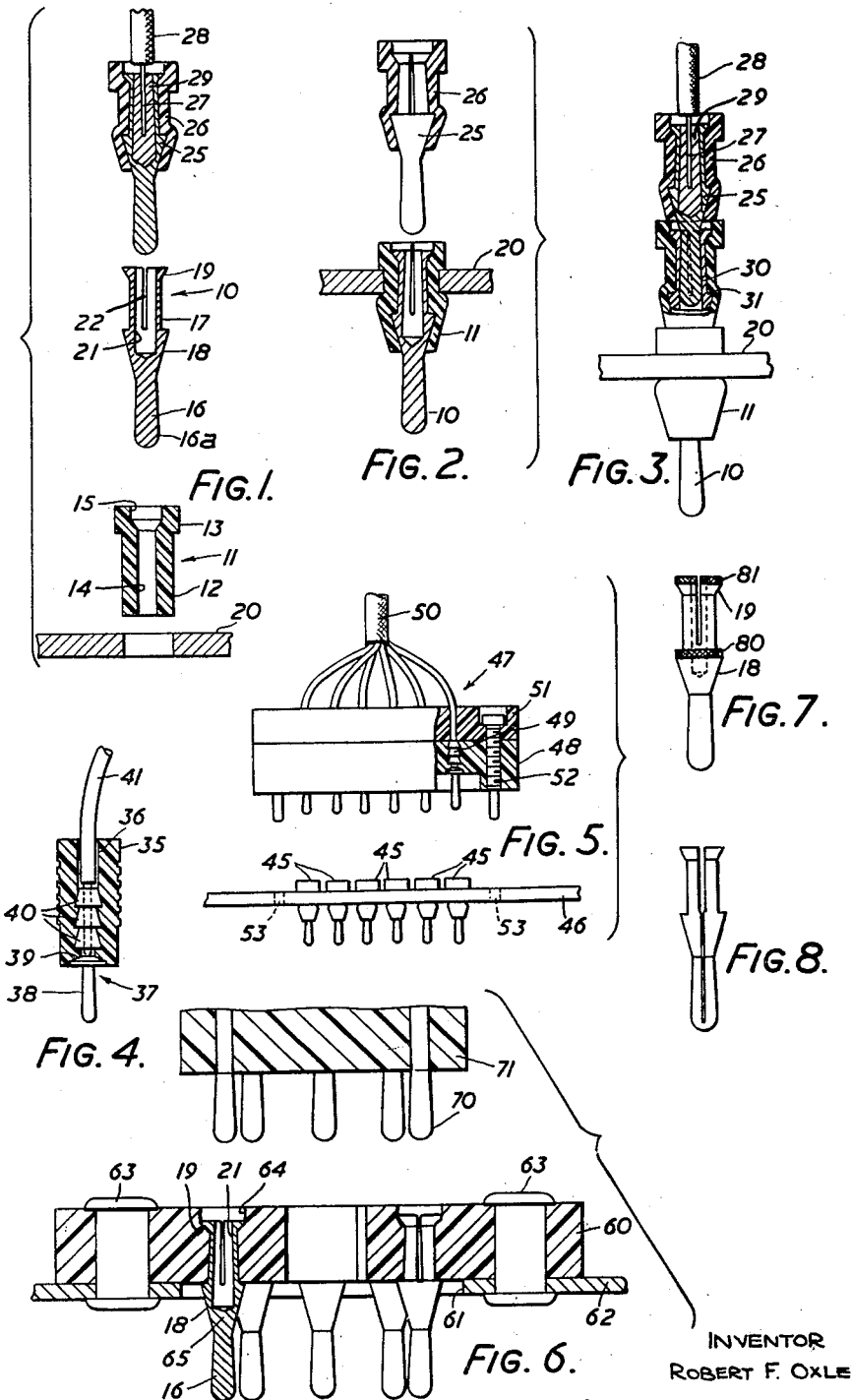
INVENTOR
ROBERT F. OXLEY
BY
WATSON, Cole, Grindle + WATSON
ATTORNEYS

3,193,895
PLUG AND SOCKET CONNECTIONS
Robert Frederick Oxley, Priory Park, Ulverston,
Lancashire, England
Filed Feb. 23, 1962, Ser. No. 175,247
4 Claims. (Cl. 24—73)

The present invention relates to plug and socket connections having utility in various fields and although the plug and socket connections are primarily intended for electrical purposes they may nevertheless be used in certain circumstances for making purely mechanical detachable connections. This application is a continuation in part of our application Serial No. 804,164 filed April 6, 1959, now abandoned.

It is an object of the invention to provide a simple and inexpensive plug and socket connection which nevertheless will be effective in retaining the plug in the socket even under conditions in which considerable vibration is experienced.

This is achieved by the invention by means of three simple parts, namely a socket support member, a socket member and a plug member. The socket member has a tubular wall portion which is positioned in a bore in a socket support member of resiliently deformable material. The tubular wall portion has at least one longitudinal slit and its outside diameter is greater than the inside diameter of the bore in which it lies so that the tubular wall portion will be compressed so that the socket which it forms will become tapered, having its smallest cross-section at the entrance. The plug member of the connection has a plug portion entered in the socket, the plug portion having a tapering portion which is of progressively reducing diameter away from the tip of the plug portion and thus has a reverse taper corresponding to the taper produced in the socket. When the plug portion is entered into the socket the walls of the socket will be forced apart to permit the passage of the tip but once the tip has passed the entrance to the socket the resilience of the socket support member will tend to close the socket around the tapered portion of the plug portion to tend to force the plug portion further into the socket. Thus the plug is securely held in the socket and any vibration experienced will tend to move the plug portion further into the socket and not out of the socket. During withdrawal of the plug from the socket the socket has to be progressively expanded to allow the passage of the tip of the plug portion in contrast with a plug and socket connection in which the plug portion is of constant cross-section as is commonly the case. The resiliently deformable socket support member supports the tubular wall portion forming the socket and provides added resilience to this portion and permit greater gripping forces on the plug portion than is possible if gripping results purely from the resilience of the socket member itself.

It has previously been proposed, see for example Johnson Patent No. 2,704,357 and Abrams Patent No. 2,931,007 to support a slit socket member in an insulating socket support member but in neither of these disclosures does the tubular wall portion of the socket lie in a bore of smaller diameter than the outside diameter of the tubular wall portion and consequently the socket support member does not compress the socket to form a tapered socket, nor does the socket support member provide resilience and support to the socket. Moreover, neither of these patents discloses the use of a tapered plug which is an essential feature of the present invention and which co-operates with the tapered socket produced by compression of the tubular wall portion.

These and other advantages of the invention will become apparent from the embodiments of the invention which will now be described by way of example with reference to the accompanying drawings, in which:

FIGURE 1 is a longitudinal section of one embodiment showing the parts before assembly;

FIGURE 2 is a longitudinal section of the embodiment shown in FIGURE 1 but with the socket portion assembled;

FIGURE 3 is a view similar to FIGURE 2 but showing a bushing and pin used as a plug which is connected to a further bushing and pin which are in turn connected to the assembled socket portion of FIGURE 2;

FIGURE 4 is a longitudinal section through a plug which may be substituted for the plug shown in FIGURES 1 and 2;

FIGURE 5 shows a number of fittings of the construction shown in FIGURES 1 and 2 used to form a multi-pin plug and socket connection;

FIGURE 6 is a cross-section through a valve holder and valve; and

FIGURES 7 and 8 show two further constructions of plug members which may be substituted for the plug members shown in FIGURES 1, 2, 3, 5 and 6.

Referring to FIGURE 1, the socket fitting consists of two parts, namely a socket member 10 and a socket support member or bushing 11 and is adapted for attachment to a perforated member 20. The socket support member 11 is made of an elastical deformable material such as polytetrafluoroethylene and consists of a cylindrical portion 12 and a shoulder 13 of larger diameter.

The socket support member has a longitudinal bore 14 which is of constant small diameter within the cylindrical portion 12 and tapers to a larger diameter 15 within the shoulder 13.

The socket member 10 is made of metal and is of circular cross-section. It comprises an end portion 16 which has a reverse taper, the diameter progressively decreasing away from the tip 16a, and a central portion 17 which is of larger diameter than the internal diameter of the bore 14. Between the portions 16 and 17 there is an enlargement 18 in the form of a conical formation and at the outer end of the central portion 17 there is a conical enlargement forming a flange 19. The socket member has a blind bore 21 formed in it extending from the end having the flange 19 into the enlargement 18 and forming a tubular wall portion forming a socket. The tubular wall portion has longitudinal slits 22 in it. Also shown in FIGURE 1 is a plug member 25 which is identical with the socket member 10 and has been pushed into a bushing 26 which is identical with the socket support member 11. The end 27 of an insulated conductor wire 28 has been connected to the plug member by entering the end 27 into the socket in the plug member 25 and filling the plug member with solder 29.

The socket assembly is attached to the perforated member 20 by first pressing the socket support member 11 into a hole in the perforated member as far as is permitted by the flange 13. The socket member 10 is then pressed into the bore 14 in the socket support member until the flange 19 butts against the taper in the bore 14 and the tip 16a of the socket member is below the end surface of the socket support member, as will be seen in FIGURE 2. The enlargement 18 will now be beyond the far side of the perforated member 20 and will expand the socket support member to prevent its removal from the perforated member.

As will be seen from FIGURE 2 the tubular wall portion of the socket member is placed under compression by the socket support member, which slightly reduces the cross-section of the socket and produces a tapered socket. When the enlarged or bulbous tip of the plug portion of the plug member 25 is entered into the socket it will snap into the socket and be held therein by reason of the reverse taper on the plug member. The resilience of the material of the socket support member 11 and of the tubular wall portion of the socket member 10 will permit the socket to open slightly as the tip of the plug portion is inserted into it, and the resilience of these portions will tend to close the socket after the tip of the plug member has entered the socket to retain the plug member securely within the socket. If the assembly is subject to any vibration the co-operation between the taper in the socket and the reverse taper on the plug portion will tend to move the plug portion further into the socket.

In the assembly shown in FIGURE 3, a further plug and socket assembly has been interposed between the plug member and the socket member of the arrangement shown in FIGURE 2. In the arrangement shown in FIGURE 3 the plug member 25 is inserted into the socket of a socket member 30 which is supported in a socket support member 31.

FIGURE 4 shows an alternative construction of plug. The plug comprises a sleeve 35 of polytetrafluoroethylene having a longitudinal bore 36 into which is pressed a plug member 37 having a reverse-tapered plug portion 38, a central radially extending flange 39 and three conical enlargements 40 which retain the plug member in the sleeve 35. The plug member has a blind bore in the end carrying the enlargements 40 in which the end of an insulated terminal wire 41 is secured by soldering.

In the arrangement shown in FIGURE 5 a row of six socket fittings 45 of the construction shown in the lower half of FIGURE 2 are attached to a perforated member 46 with their sockets all opening upwardly. Adapted to engage with the socket fittings is a multi-pin plug 47 comprising a carrier block 48 of polytetrafluoroethylene into holes in which are pressed six plug members 49 of the form shown in FIGURE 4. The end portions of the plug members 49 project downwardly and are so spaced that they are each able to enter the socket of one of the socket members attached to the perforated member 46. Each conductor of a six-core cable 50 passes through a hole in the cover block 51 into the socket of one of the plug members 49 where it is secured by solder. The cover block 51 is secured to the carrier block 48 by two screws, 52, one at each end of the row of plug members 49. The screws 52 pass through the carrier block 48 and project below its lower surface to form guide pins which can enter holes in the perforated member 46.

Referring now to FIGURE 6, there is shown a valve holder which comprises a disc 60 of polytetrafluoroethylene which is secured over a hole 61 in a member 62 which may be the chassis of a wireless set, by two rivets 63. The disc 60 which constitutes a socket support member has a number of holes 64 on a suitable pitch circle, the holes being of the same form as the bore 14 in the socket support member 11 shown in FIGURE 1. Each of the holes 64 has pushed into it a socket member 65 of the same form as the socket member 10 shown in FIGURE 1, the socket members being pushed through the holes until the enlargements 18 are below the lower surface of the block and the flanges 19 engage the tapering parts of the holes 64. The projecting parts 16 of the pins may have conductors secured to them and the sockets 21 will receive the pins 70 of a valve 71 only a small part of which is shown. The pins 70 have reverse tapers similar to those of the plug member 25 shown in FIGURE 1.

The member shown in FIGURE 7 is similar to the socket member 10 and the plug member 25 shown in FIGURE 1 but has a small band 80 around the top of the conical enlargement 18 which is knurled or splined to resist rotation of the member when it is in position. There is a similar knurled or splined band 81 around the top of the flange 19. FIGURE 8 shows a pin which has been manufactured from sheet material by pressing and forming.

What I claim as my invention and desire to secure by Letters Patent is:

1. A plug and socket connection comprising a socket support member of resiliently deformable material having a cylindrical bore therethrough, a socket member having at one end thereof a tubular wall portion formed by a longitudinal blind bore in said socket member, said longitudinal bore having an open end and being, in the unstressed condition of the socket member, of substantially constant cross-section, said tubular wall portion lying within said cylindrical bore and forming a socket, said tubular wall portion having at least one longitudinal slit and having an outside diameter which, in the unstressed condition of the socket member, is greater than the inside diameter of the bore in which it lies to deform said tubular wall portion, said socket having a cross-section which progressively increases away from said open end, and a plug member having a plug portion entered into said socket, said plug portion having a tip and a tapering portion so related to the diameter of said socket that the tapering portion of said plug will be held therein.

2. A plug and socket connection for securing in a hole through a member comprising a bushing of resiliently deformable material having a longitudinal bore, said bushing having also a portion of small outside diameter having a free end and receivable with a close fit into said hole and a portion of large outside diameter too big to enter said hole, the length of said small portion being larger than the length of said hole, whereby said free end of said small portion projects through said hole, a socket member having an enlargement bigger than the bore of said bushing but small enough to be forced into the bore of such bushing until said enlargement has passed through and lies in said projecting portion beyond said hole and expands said projecting portion radially to prevent its retraction through said hole, the length of said socket member being such that when inserted in said bushing one end of said socket member projects from said bushing, the socket member having at the other end a tubular wall portion which forms a socket lying within said bushing and which has a wall which contains at least one longitudinal slit, the outside diameter of said tubular wall portion being greater than the inside diameter of the bore in which it lies, and a plug member having a plug portion adapted to enter said socket, said plug portion having a tip and a tapering portion so related to the diameter of said socket that the tapering portion of said plug will be held therein.

3. A plug and socket connection comprising a mounting wall having an aperture therethrough and upper and lower surfaces, a bushing of resiliently deformable material, said bushing having a longitudinal bore, a portion of large outside diameter too big to enter said aperture and engaging said upper surface of said mounting wall and a portion of small outside diameter extending from said large portion through said aperture and projecting beyond said lower surface, a socket member lying partly within said bore and having an enlargement bigger than said bore, said enlargement lying within said projecting portion of said bushing beyond said lower surface and expanding said projecting portion radially to prevent its retraction through said aperture, the socket member having at one end thereof a tubular wall portion open at one end and lying within said bore and forming a socket, said tubular wall portion having a least one longitudinal slit and having an outside diameter which is greater than the inside diameter of the bore in which it lies to compress said socket, and a plug member having a plug portion entered into said socket, said plug portion having a tip and a tapering portion so related to the diameter of said socket that the tapering portion of said plug will be held therein.

4. A fitting comprising a disc of resiliently deformable insulating material having a plurality of parallel bores through said disc and a plurality of socket members, each socket member having an enlargement which is bigger than one of said bores and which is adapted to be forced into said bore so that one end of said socket member projects beyond said bore, each socket member having at the end thereof remote from said projecting end a tubular wall portion open at its end and lying within the bore through said member and forming a socket, said tubular wall portion having at least one longitudinal slit and having an outside diameter which is greater than the inside diameter of the bore in which it lies to compress said socket, and a plug member having the same number of plug portions as there are socket members, each plug portion having a tip and a tapering portion so related to the diameter of said socket that the tapering portion of said plug will be held therein.

References Cited by the Examiner

UNITED STATES PATENTS

| | | | |
|---|---|---|---|
| 714,869 | 12/02 | Cravens | 339—196 X |
| 1,956,037 | 4/34 | MacDonald | 339—196 X |
| 2,229,377 | 1/41 | Friang | 339—61 X |
| 2,742,624 | 4/56 | Stevens | 339—59 X |
| 2,855,206 | 10/58 | Haviland | 287—126 X |
| 2,958,843 | 11/60 | Long | 339—61 |

DONLEY J. STOCKING, *Primary Examiner.*

JOSEPH D. SEERS, *Examiner.*